(12) United States Patent
Wang et al.

(10) Patent No.: US 11,294,497 B2
(45) Date of Patent: Apr. 5, 2022

(54) TOUCH-AND-DISPLAY DEVICE AND SENSING SYSTEM WITH PERIPHERAL ELECTRODE FOR TRANSMITTING UPLINK SIGNAL

(71) Applicant: HIMAX TECHNOLOGIES LIMITED, Tainan (TW)

(72) Inventors: Hui-Min Wang, Tainan (TW); Ren-Hao Ye, Tainan (TW)

(73) Assignee: HIMAN TECHNOLOGIES LIMITED, Tainan (TW)

( * ) Notice: Subject to any disclaimer, the term of this patent is extended or adjusted under 35 U.S.C. 154(b) by 286 days.

(21) Appl. No.: 16/662,007

(22) Filed: Oct. 23, 2019

(65) Prior Publication Data
US 2020/0401272 A1 Dec. 24, 2020

Related U.S. Application Data

(60) Provisional application No. 62/862,695, filed on Jun. 18, 2019.

(51) Int. Cl.
*G06F 3/041* (2006.01)
*G06F 3/044* (2006.01)
(Continued)

(52) U.S. Cl.
CPC ...... *G06F 3/04162* (2019.05); *G02F 1/13338* (2013.01); *G02F 1/133512* (2013.01);
(Continued)

(58) Field of Classification Search
CPC .. G06F 3/04162; G06F 3/0441; G06F 3/0443; G06F 3/03545; G06F 3/0412; G02F 1/13338; G02F 1/133512
See application file for complete search history.

(56) References Cited

U.S. PATENT DOCUMENTS 9,817,491 B2  11/2017 Rebeschi et al.
2011/0050624 A1  3/2011 Lee
(Continued)

FOREIGN PATENT DOCUMENTS

CN  107272921 A  10/2017
CN  107977112 A   5/2018
(Continued)

*Primary Examiner* — Lisa S Landis
(74) *Attorney, Agent, or Firm* — CKC & Partners Co., LLC

(57) ABSTRACT

The touch-and-display panel includes multiple sensing electrodes in the display area. A circuit is disposed in the non-display area and electrically connected to the sensing electrodes through sensing lines. A peripheral electrode is disposed in the non-display area. In a display period, the circuit applies a common voltage to the sensing electrodes through the sensing lines. In a touch sensing period, the circuit transmits a touch sensing signal to the sensing electrodes through the sensing lines, and determines whether each of the sensing electrodes is touched based on capacitance of the sensing electrodes. In a stylus sensing period, the circuit transmits an uplink signal to the sensing electrodes and the peripheral electrode, and receives a downlink signal from the active stylus through the sensing electrodes, and determines a stylus location corresponding to the active stylus according to the downlink signal.

10 Claims, 4 Drawing Sheets

(51) Int. Cl.
 *G02F 1/1333* (2006.01)
 *G02F 1/1335* (2006.01)
 *G06F 3/0354* (2013.01)

(52) U.S. Cl.
 CPC ........ *G06F 3/03545* (2013.01); *G06F 3/0412* (2013.01); *G06F 3/0441* (2019.05); *G06F 3/0443* (2019.05)

(56) References Cited

U.S. PATENT DOCUMENTS

| | | |
|---|---|---|
| 2016/0365367 A1 | 12/2016 | Kimura et al. |
| 2017/0285771 A1* | 10/2017 | Jung .................. G06F 3/0412 |
| 2018/0113519 A1 | 4/2018 | Yamamoto |
| 2018/0113523 A1 | 4/2018 | Hara et al. |
| 2018/0277029 A1 | 9/2018 | Lee et al. |
| 2018/0356908 A1 | 12/2018 | Koike et al. |
| 2019/0095034 A1 | 3/2019 | Xu et al. |
| 2019/0179475 A1 | 6/2019 | Seo et al. |
| 2019/0196639 A1* | 6/2019 | Mugiraneza ............ G06F 3/046 |
| 2020/0004367 A1 | 1/2020 | Lee et al. |
| 2020/0210021 A1 | 7/2020 | Ju et al. |

FOREIGN PATENT DOCUMENTS

| | | |
|---|---|---|
| CN | 109213359 A | 1/2019 |
| CN | 109582170 A | 4/2019 |
| TW | I609310 B | 12/2017 |

\* cited by examiner

TOUCH-AND-DISPLAY DEVICE AND SENSING SYSTEM WITH PERIPHERAL ELECTRODE FOR TRANSMITTING UPLINK SIGNAL

RELATED APPLICATIONS

This application claims priority to U.S. Provisional Application Ser. No. 62/862,695, filed Jun. 18, 2019, which is herein incorporated by reference.

BACKGROUND

Field of Invention

The present invention relates to a touch-and-display device operated with an active stylus.

Description of Related Art

Recently, a stylus has been widely used as a human interface device (HID) for smart phones and tablets. The stylus can be classified as a passive stylus and an active stylus. In the operation of a general active stylus, a touch screen sends an uplink signal to the active stylus, and the active stylus transmits a downlink signal to the touch screen. As shown in FIG. 1, a user can draw or write on a touch screen 120 by using an active stylus 110. When the user draws a line extending to the edge of the touch screen, the line may be broken (the line is not shown near the edge of the touch screen) because the strength of the uplink signal is weak. It is an issue concerned by people in the art about how the problem of the broken line is solved.

SUMMARY

Embodiments of the present disclosure provide a touch-and-display device operated with an active pen. Touch-and-display device has a display area and a non-display area and includes a touch-and-display panel, a circuit and a peripheral electrode. The touch-and-display panel includes multiple sensing electrodes in the display area. The sensing electrodes are electrically insulated with each other. The circuit is disposed in the non-display area and electrically connected to the sensing electrodes through multiple sensing lines. The peripheral electrode is disposed in the non-display area. In a display period, the circuit applies a common voltage to the sensing electrodes through the sensing lines. In a touch sensing period, the circuit transmits a touch sensing signal to the sensing electrodes through the sensing lines, and determines whether each of the sensing electrodes is touched based on capacitance of the sensing electrodes. In a stylus sensing period, the circuit transmits an uplink signal to the sensing electrodes and the peripheral electrode, and receives a downlink signal from the active stylus through the sensing electrodes, and determines a stylus location corresponding to the active stylus according to the downlink signal.

In some embodiments, the peripheral electrode has a continuous structure surrounding the display area.

In some embodiments, the peripheral electrode includes copper foil, conductive paint, conductive adhesive, conductive past, or conductive iron.

In some embodiments, the touch-and-display device further includes: a first substrate, in which the sensing electrodes are disposed on the first substrate; a second substrate; a liquid crystal molecule disposed between the first substrate and the second substrate; and a black matrix disposed at a side of the second substrate facing the first substrate. The peripheral electrode is disposed at a side of the black matrix facing the first substrate.

In some embodiments, the black matrix completely covers the peripheral electrode.

From another aspect, embodiments of the present disclosure provide a sensing system includes an active stylus and a touch-and-display device. The Active stylus includes a case and a conductive tip. Touch-and-display device has a display area and a non-display area and includes a touch-and-display panel, a circuit and a peripheral electrode. The touch-and-display panel includes multiple sensing electrodes in the display area. The sensing electrodes are electrically insulated with each other. The circuit is disposed in the non-display area and electrically connected to the sensing electrodes through multiple sensing lines. The peripheral electrode is disposed in the non-display area. In a display period, the circuit applies a common voltage to the sensing electrodes through the sensing lines. In a touch sensing period, the circuit transmits a touch sensing signal to the sensing electrodes through the sensing lines, and determines whether each of the sensing electrodes is touched based on capacitance of the sensing electrodes. In a stylus sensing period, the circuit transmits an uplink signal to the sensing electrodes and the peripheral electrode, and receives a downlink signal from the active stylus through the sensing electrodes, and determines a stylus location corresponding to the active stylus according to the downlink signal.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology, but are not referred to particular order or sequence.

Figure 1:
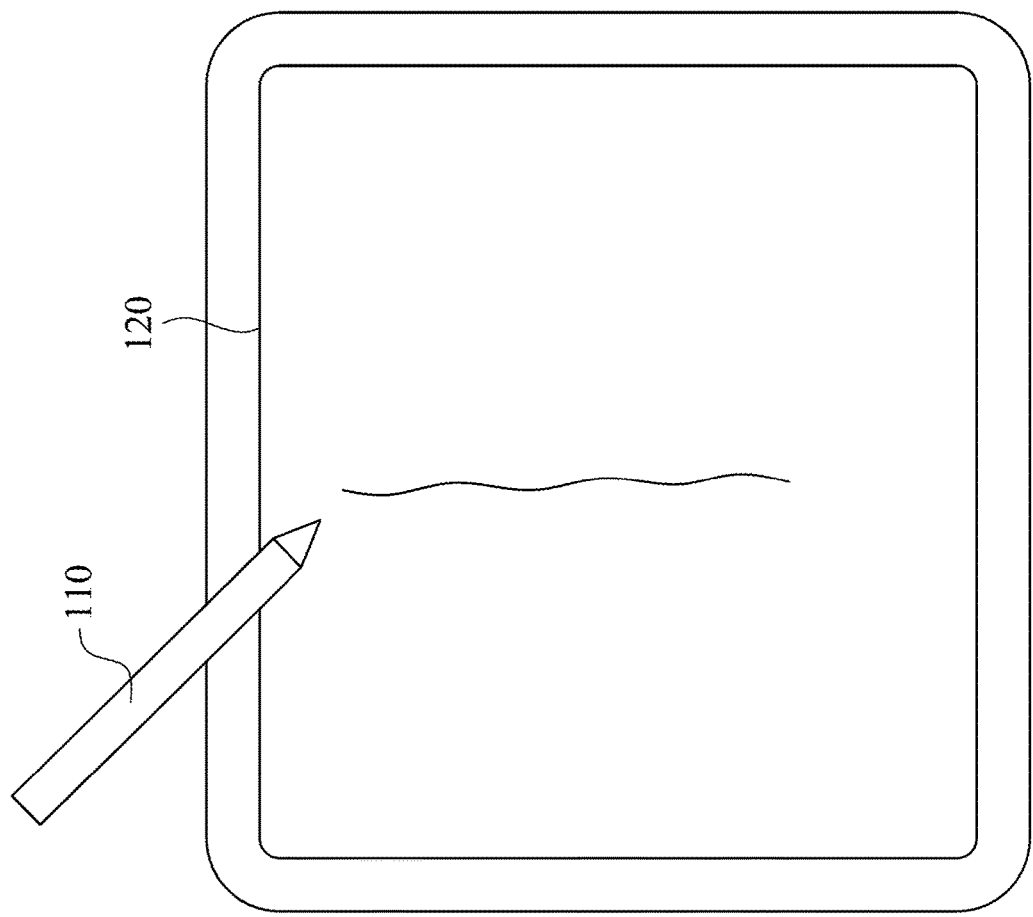
FIG. 1 is a schematic diagram of a touch screen and an active stylus.
Figure 2:
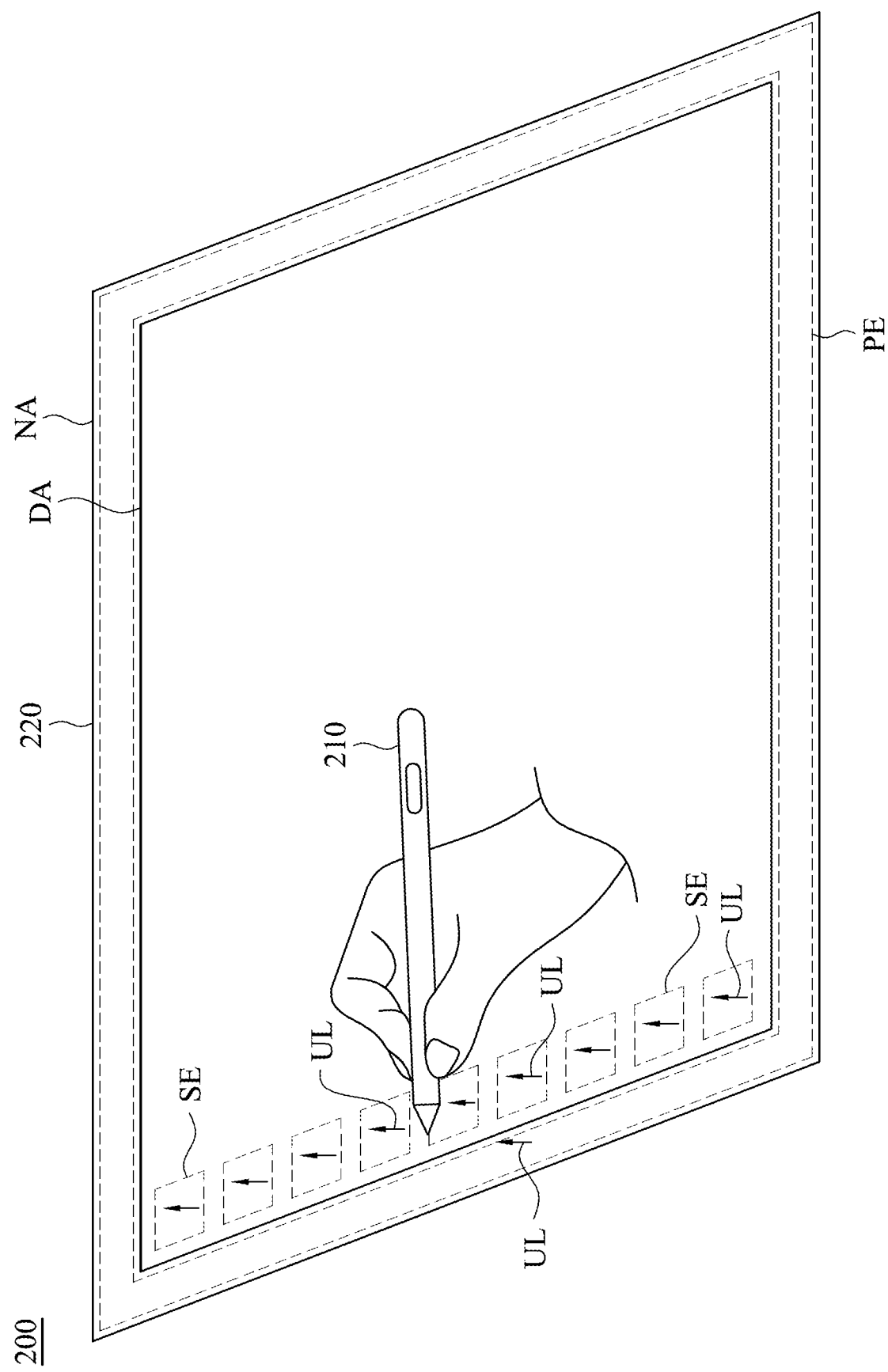
FIG. 2 is a schematic diagram of a sensing system in accordance with an embodiment.

FIG. 2 is a schematic diagram of a sensing system in accordance with an embodiment. A sensing system 200 includes an active stylus 210 and a touch-and-display device 220. A user can write or draw on the touch-and-display device 220 by using the active stylus 210. Multiple sensing electrodes SE are disposed in a display area DA of the touch-and-display device 220 (only part of the sensing electrodes SE is illustrated in FIG. 2 for simplification) for transmitting an uplink signal UL to the active stylus 210. In particular, a peripheral electrode PE is disposed in a non-display area NA of the touch-and-display device 220 for transmitting the uplink signal UL. As a result, when the active stylus 210 moves toward the border of the touch-and-display device 220 (i.e. around the boundary between the display area DA and the non-display area NA), the active stylus 210 can receive the uplink signal UL with sufficient signal strength. Therefore, the broken line as shown in FIG. 1 will not occur.

Figure 3:
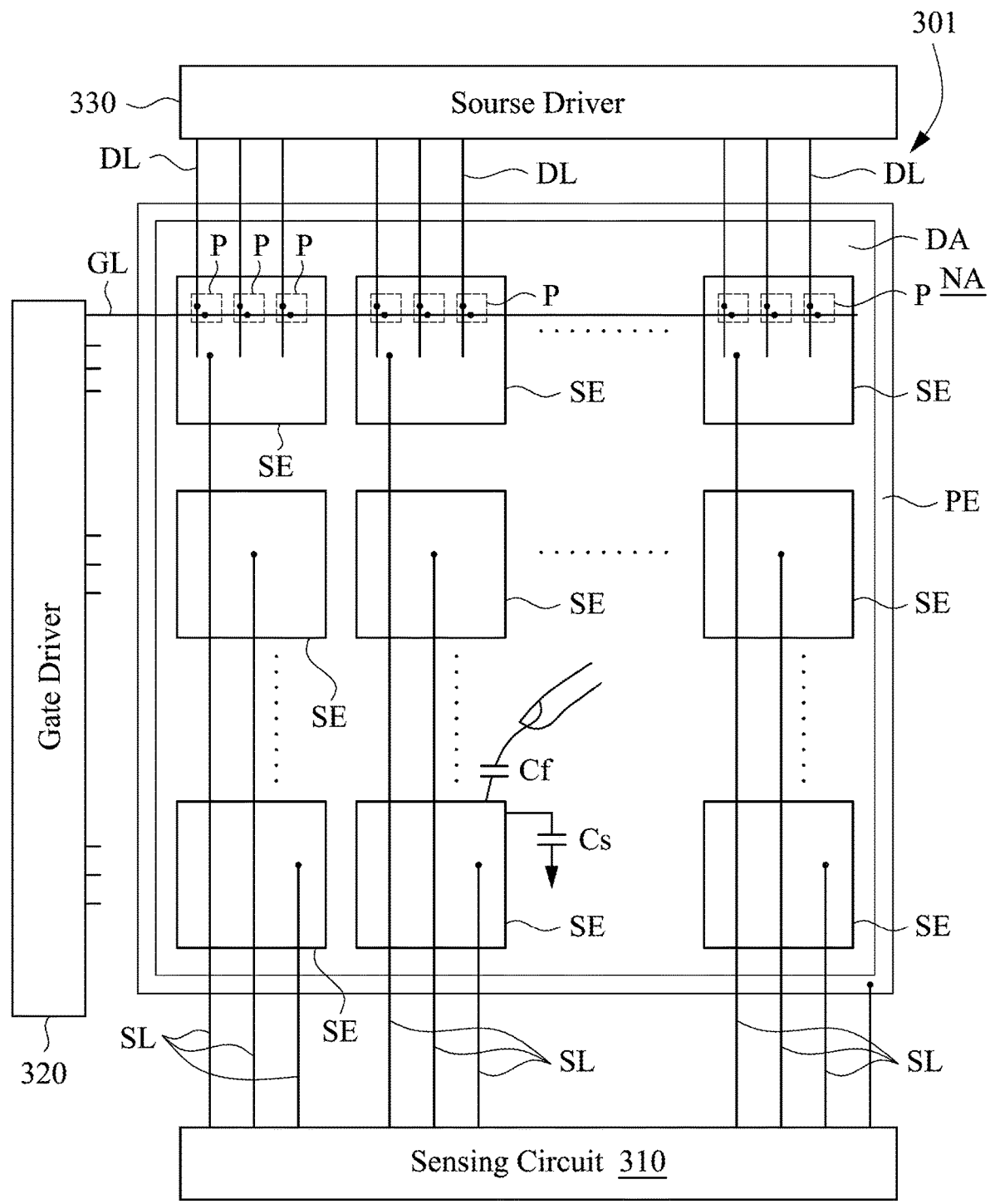
FIG. 3 is a schematic diagram of the touch-and-display device 220 in accordance with an embodiment.

FIG. 3 is a schematic diagram of the touch-and-display device 220 in accordance with an embodiment. Referring to FIG. 3, the touch-and-display device 220 includes a touch and display driver integration (TDDI) circuit and a touch-and display panel 301. Touch-and-display panel 301 has the display area DA and the non-display area NA. The sensing electrodes SE and pixel structures P are disposed in the display area DA. The TDDI circuit includes a sensing circuit 310, a gate driver 320, and a source driver 330 in the non-display area NA. The touch-and-display device 220 also includes sensing lines SL, gate lines GL, and data lines DL. The sensing electrodes SE are electrically insulated with each other and electrically connected to the sensing circuit 310 through the sensing lines SL respectively. Each sensing electrode SE corresponds to multiple pixel structures P and serves as a common electrode of the corresponding pixel structure P. Each pixel structure P includes a thin film transistor (TFT) (not shown) and a pixel electrode (not shown). Each gate line GL is connected to the gate driver 320 and the gates of the TFTs of corresponding pixel structures P. Each data line DL is connected to the source driver 330 and the sources of the TFTs of corresponding pixel structures P. The drain of each TFT is connected to the corresponding pixel electrode. For simplification, not all circuits (e.g. time controller) are shown in FIG. 3, and the TDDI circuit may include other components.

The peripheral electrode PE is disposed in the non-display area NA. The peripheral electrode is electrically connected to the sensing circuit 310 through a conductive line. In some embodiments, the peripheral electrode PE has a continuous structure surrounding the display area DA. However, in some embodiments, the peripheral electrode PE may have multiple discontinuous structures (e.g. rectangle structures), and each of the discontinuous structures is electrically connected to the sensing circuit 310.

In a display period, the gate driver 320 turns on the corresponding TFTs through the gate lines GL, and the source driver 330 transmits pixel data to the corresponding pixel electrodes through the data lines DL, and the sensing circuit 310 applies a common voltage to the sensing electrodes SE through the sensing lines SL. A voltage difference between the pixel electrode and the sensing electrode SE is configured to orient liquid crystal molecules to determine a brightness of a pixel. In other embodiments, the touch- and display panel 301 may be an organic light emitting diode (OLED) panel or any other suit display panel.

In a touch sensing period, it is determined whether each sensing electrode SE is touched by a self-inductive capacitance sensing method. To be specific, a capacitor Cs is formed on each sensing electrode SE (only one capacitor Cs is shown in FIG. 3 for simplification). When a finger (or passive stylus) touches one sensing electrode SE, a capacitor Cf is formed between the finger and the touched sensing electrode SE such that the total capacitance of the touched sensing electrode SE changes. The sensing circuit 310 transmits a touch sensing signal to the sensing electrodes SE through the sensing lines SL, in which the quantity of the charges accumulated on the sensing electrodes SE reflects the capacitance thereof, and thus the sensing circuit 310 can determine which sensing electrode SE is touched based on the capacitance. For example, sensing circuit 310 includes a multiplexer, an integrator, and/or an analog to digital converter which is not limited in the invention. In addition, the touch sensing signal may have waveforms of square, triangle, sine or any suitable waveform, which is not limited in the invention.

Figure 4:
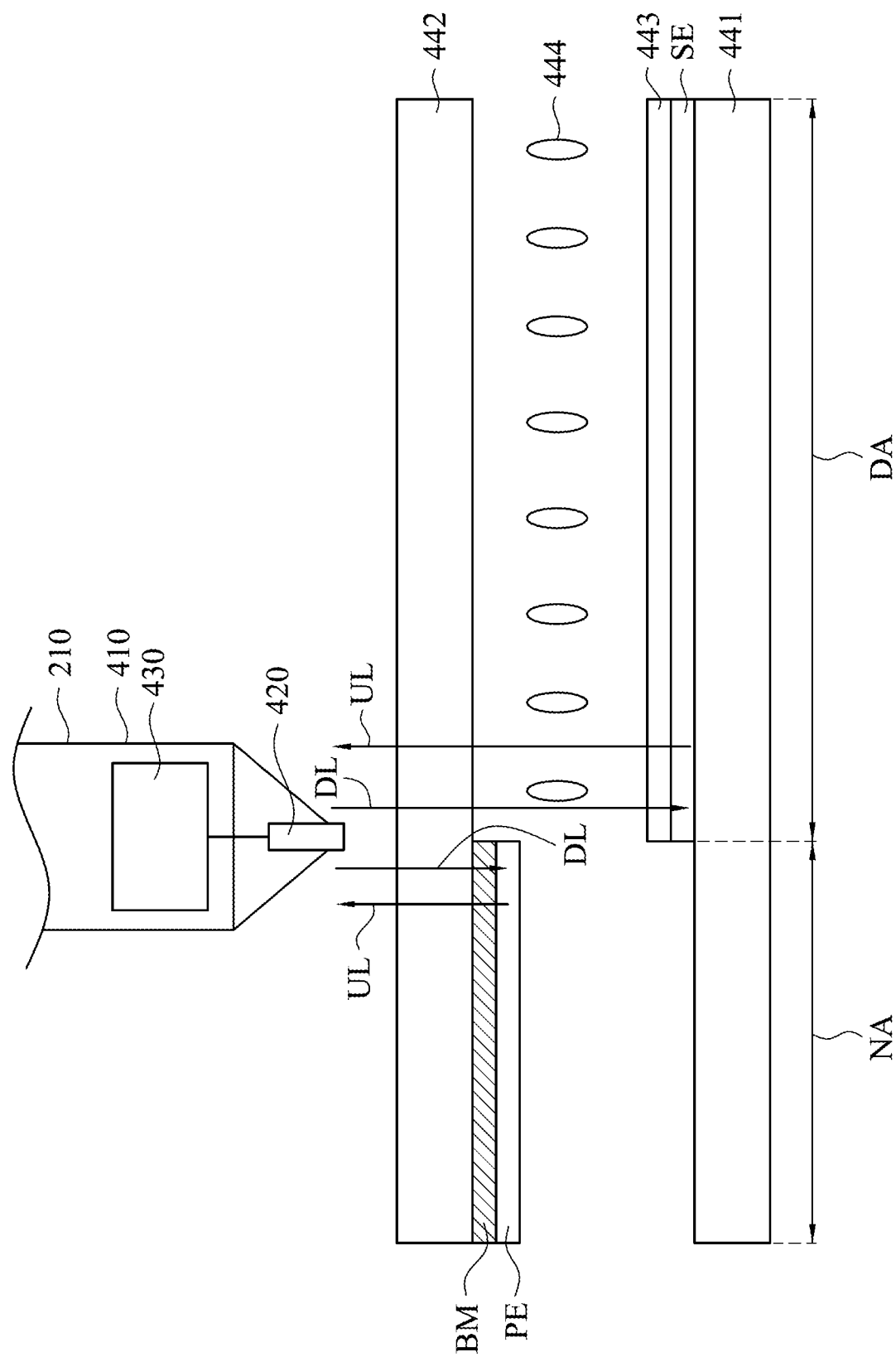
FIG. 4 is a schematic cross-sectional view of the sensing system in accordance with an embodiment.

In an active stylus sensing period, the sensing circuit 310 transmits the uplink signal to the sensing electrodes SE and the peripheral electrode PE. FIG. 4 is a schematic cross-sectional view of the sensing system in accordance with an embodiment. Referring to FIG. 4, the touch-and-display device 220 further includes a first substrate 441 (also referred to a TFT substrate) and a second substrate 442 (also referred to a color filter substrate). Liquid crystal molecules 444 are disposed between the first substrate 441 and the second substrate 442. The pixel structures and the sensing electrodes SE are disposed on the first substrate 441 in the display area DA. Note that only the sensing electrodes SE and an insulation layer 443 are illustrated in FIG. 4 for simplification. A black matrix BM and the peripheral electrode PE are disposed on the second substrate 442 in the non-display area NA. The black matrix BM is disposed at a side of the second substrate 442 facing the first substrate 441, and the peripheral electrode PE is disposed at a side of the black matrix BM facing the first substrate 441. In some embodiments, the black matrix BM completely covers the peripheral electrode PE so that the user would not see the peripheral electrode PE. In some embodiments, the peripheral electrode PE includes transparent material such as indium tin oxide (ITO), indium zinc oxide (IZO), antimony tin oxide (ATO), fluorine tin oxide (FTO), etc. In some embodiments, the peripheral electrode PE includes opaque material such as copper foil, conductive paint, conductive adhesive, conductive past, or conductive iron.

On the other hand, the active stylus 210 includes a case 410 and a conductive tip 420 which protrudes from the case 410. A signal processing circuit 430 is disposed in the case 410 and electrically connected to the conductive tip 420 and the case 410. The uplink signal UL is transmitted to the conductive tip 420 through the sensing electrodes SE and/or the peripheral electrode PE. The signal processing circuit 430 receives the uplink signal UL through the conductive tip 420. The uplink signal UL is a time-varying signal, for example, including pulses. In addition, the signal processing circuit 430 takes the voltage of the case 410 as a ground voltage, and analyzes the uplink signal UL according to a differential signal between the uplink signal UL and the ground voltage. In some embodiments, the signal processing circuit 430 can detect the period, duty cycle, number of pulses, rising edge, or falling edge of the pulses in the uplink signal UL to obtain the information carried by the uplink signal UL. In some embodiments, the uplink signal is configured to carry synchronization information (e.g. by the raising edge or the falling edge), and thus the active stylus 210 can transmit the downlink signal DL synchronized with the raising edge or the falling edge of the uplink signal UL.

Referring to FIG. 3 and FIG. 4, in the active stylus sensing period, the sensing circuit 310 receives the downlink signal DL from the active stylus 210 through the sensing electrodes SE. The sensing circuit 310 can determine a stylus location corresponding to the active stylus 210 according to the downlink signal DL. For example, the sensing circuit 310 includes a multiplexer and a demodulation circuit (not shown) in which the multiplexer is configured to connect the sensing electrodes SE to the demodulation circuit sequentially so that the demodulation circuit can determine the stylus location according to the present and/or content of the downlink signal DL. In some embodiments, the sensing circuit 310 may receive the downlink signal DL through the peripheral electrode PE to determine if the active stylus 210 moves into the non-display area NA. In some embodiments, the downlink signal DL is configured to carry pressure information, tilt information, or button information in addition to determine the stylus location. For example, the active stylus 210 includes a pressure sensor, an inertial sensor and a button. The pressure information indicates the pressure of the active stylus 210 pressed on the touch-and-display device 220. The tile information indicates the tile angle of the active stylus 210. The button information indicates if the button of the active stylus 210 is pressed.

In some embodiments, the sensing circuit 310 may apply a direct current (DC) voltage to the peripheral electrode PE and/or the sensing electrodes SE. For example, in the touch sensing period, the sensing circuit 310 classifies the sensing electrodes SE into touched electrodes and untouched electrodes, and in the active stylus sensing period, transmits the uplink signal to the untouched electrodes and applies the DV voltage to the touched electrode. The potential level of the DC voltage is not limited in the invention. Accordingly, the uplink signal will not be transmitted to the case 410 of the active stylus 210 through the user's hand. In some embodiments, the sensing circuit 310 transmits the aforementioned touch sensing signal to the peripheral electrode PE and determines if the peripheral electrode PE is touched in the touch sensing period. In the active stylus sensing period, the sensing circuit 310 applies the DV voltage to the peripheral electrode PE if the peripheral electrode PE is touched; and the sensing circuit 310 transmits the uplink signal UL to the peripheral electrode PE if the peripheral electrode PE is not touched. As a result, the uplink signal UL will not be transmitted to the case 410 through the peripheral electrode PE and the user's hand.

The uplink signal UL and/or the downlink signal DL can be configured to carry any information by a modulation technology such as direct-sequence spread spectrum (DSSS), frequency-hopping spread spectrum (FHSS), TH-time hopping (THSS), phase-shift keying (PSK), pulse-amplitude modulation (PAM), quadrature amplitude modulation (QAM), single-sideband modulation (SSB), but the technology of the modulation and the content of the carried information are not limited in the invention.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A touch-and-display device operated with an active pen, wherein touch-and-display device has a display area and a non-display area and comprises:

a touch-and-display panel, comprising a plurality of sensing electrodes in the display area, wherein the sensing electrodes are electrically insulated with each other;

a circuit, disposed in the non-display area and electrically connected to the sensing electrodes through a plurality of sensing lines; and a peripheral electrode, disposed in the non-display area and electrically connected to the circuit through one of the sensing lines, wherein in a display period, the circuit applies a common voltage to the sensing electrodes through the sensing lines, wherein in a touch sensing period, the circuit transmits a touch sensing signal to the sensing electrodes and the peripheral electrode through the sensing lines, and determines whether the peripheral electrode is touched and whether each of the sensing electrodes is touched based on capacitance of the sensing electrodes to classify the sensing electrodes into touched electrodes and untouched electrodes, wherein in a stylus sensing period, the circuit transmits an uplink signal to the untouched electrodes and applies a direct voltage to the touched electrodes, transmits the uplink signal to the peripheral electrode if the peripheral electrode is not touched, applies the direct voltage to the peripheral electrode if the peripheral electrode is touched, and receives a downlink signal from the active stylus through the sensing electrodes, and determines a stylus location corresponding to the active stylus according to the downlink signal.

2. The touch-and-display device of claim 1, wherein the peripheral electrode has a continuous structure surrounding the display area.

3. The touch-and-display device of claim 1, wherein the peripheral electrode comprises copper foil, conductive paint, conductive adhesive, conductive past, or conductive iron.

4. The touch-and-display device of claim 1, further comprising:

a first substrate, wherein the sensing electrodes are disposed on the first substrate;

a second substrate;

a liquid crystal molecule, disposed between the first substrate and the second substrate; and a black matrix, disposed at a side of the second substrate facing the first substrate, wherein the peripheral electrode is disposed at a side of the black matrix facing the first substrate.

5. The touch-and-display device of claim 4, wherein the black matrix completely covers the peripheral electrode.

6. A sensing system comprising:

an active stylus, comprising a case and a conductive tip; and a touch-and-display device having a display area and a non-display area, wherein the touch-and-display device comprises:

a touch-and-display panel, comprising a plurality of sensing electrodes in the display area, wherein the sensing electrodes are electrically insulated with each other;

a circuit, disposed in the non-display area and electrically connected to the sensing electrodes through a plurality of sensing lines; and a peripheral electrode, disposed in the non-display area and electrically connected to the circuit through one of the sensing lines, wherein in a display period, the circuit applies a common voltage to the sensing electrodes through the sensing lines, wherein in a touch sensing period, the circuit transmits a touch sensing signal to the sensing electrodes and the peripheral electrode through the sensing lines, and determines whether the peripheral electrode is touched and whether each of the sensing electrodes is touched based on capacitance of the sensing electrodes to classify the sensing electrodes into touched electrodes and untouched electrodes, wherein in a stylus sensing period, the circuit transmits an uplink signal to the untouched electrodes and applies a direct voltage to the touched electrodes, transmits the uplink signal to the peripheral electrode if the peripheral electrode is not touched, applies the direct voltage to the peripheral electrode if the peripheral electrode is touched, and receives a downlink signal from the active stylus through the sensing electrodes, and determines a stylus location corresponding to the active stylus according to the downlink signal.

7. The sensing system of claim 6, wherein the peripheral electrode has a continuous structure surrounding the display area.

8. The sensing system of claim 6, wherein the peripheral electrode comprises copper foil, conductive paint, conductive adhesive, conductive past, or conductive iron.

9. The sensing system of claim 6, wherein the touch-and-display device further comprises:

a first substrate, wherein the sensing electrodes are disposed on the first substrate;

a second substrate;

a liquid crystal molecule, disposed between the first substrate and the second substrate; and a black matrix, disposed at a side of the second substrate facing the first substrate, wherein the peripheral electrode is disposed at a side of the black matrix facing the first substrate.

10. The sensing system of claim 9, wherein the black matrix completely covers the peripheral electrode.

* * * * *

UNITED STATES PATENT AND TRADEMARK OFFICE
CERTIFICATE OF CORRECTION

PATENT NO. : 11,294,497 B2
APPLICATION NO. : 16/662007
DATED : April 5, 2022
INVENTOR(S) : Wang et al.

It is certified that error appears in the above-identified patent and that said Letters Patent is hereby corrected as shown below:

On the Title Page

Item (73), the name of the Assignee should read as "HIMAX TECHNOLOGIES LIMITED ," rather than "HIMAN TECHNOLOGIES LIMITED".

Signed and Sealed this
Twenty-seventh Day of September, 2022

Katherine Kelly Vidal
*Director of the United States Patent and Trademark Office*